United States Patent
Butcher et al.

(10) Patent No.: US 10,778,574 B2
(45) Date of Patent: Sep. 15, 2020

(54) SMART NETWORK INTERFACE PERIPHERAL CARDS

(71) Applicant: DELL PRODUCTS, LP, Round Rock, TX (US)

(72) Inventors: Andrew Butcher, Cedar Park, TX (US); Lee Eric Ballard, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/242,377

(22) Filed: Jan. 8, 2019

(65) Prior Publication Data

US 2020/0220812 A1    Jul. 9, 2020

(51) Int. Cl.
*H04L 12/721* (2013.01)
*H04L 29/08* (2006.01)
*H04L 29/06* (2006.01)
*H04L 12/725* (2013.01)

(52) U.S. Cl.
CPC .......... *H04L 45/566* (2013.01); *H04L 45/304* (2013.01); *H04L 67/025* (2013.01); *H04L 69/16* (2013.01); *H04L 69/22* (2013.01)

(58) Field of Classification Search
CPC .................................................... H04L 45/566
See application file for complete search history.

(56) References Cited

U.S. PATENT DOCUMENTS

| | | | |
|---|---|---|---|
| 9,398,043 B1 * | 7/2016 | Yang | H04L 63/1441 |
| 9,432,458 B2 | 8/2016 | Lambert et al. | |
| 9,891,678 B2 | 2/2018 | Butcher et al. | |
| 9,960,987 B2 | 5/2018 | Claggett et al. | |
| 2016/0337228 A1 * | 11/2016 | Cai | H04L 45/64 |
| 2017/0187633 A1 | 6/2017 | Ballard et al. | |
| 2018/0314611 A1 | 11/2018 | Puthillathe et al. | |
| 2018/0357098 A1 | 12/2018 | Dube et al. | |

* cited by examiner

*Primary Examiner* — Kevin M Cunningham
(74) *Attorney, Agent, or Firm* — Larson Newman, LLP (57) ABSTRACT

Remote management of an information handling system is based on a dynamic port assignment. A port number in the TCP/IP protocol identifies packets of data reserved for the remote management of peripheral devices connected to, or communicating with, the information handling system. When a network interface card receives the packets of data, the network interface card compares headers of the packets of data to the port number reserved for the remote management. The network interface card identifies and routes the packets of data having the headers specifying the port number for the remote management of the information handling system.

20 Claims, 7 Drawing Sheets

SMART NETWORK INTERFACE PERIPHERAL CARDS

FIELD OF THE DISCLOSURE

The present disclosure generally relates to information handling systems, and more particularly relates to network interface peripheral cards.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Remote management of an information handling system is based on a dynamic port assignment. A port number in the TCP/IP protocol identifies packets of data reserved for the remote management of peripheral devices connected to, or communicating with, the information handling system. When a network interface card receives the packets of data, the network interface card compares headers of the packets of data to the port number reserved for the remote management. The network interface card identifies and routes the packets of data having the headers specifying the port number for the remote management of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
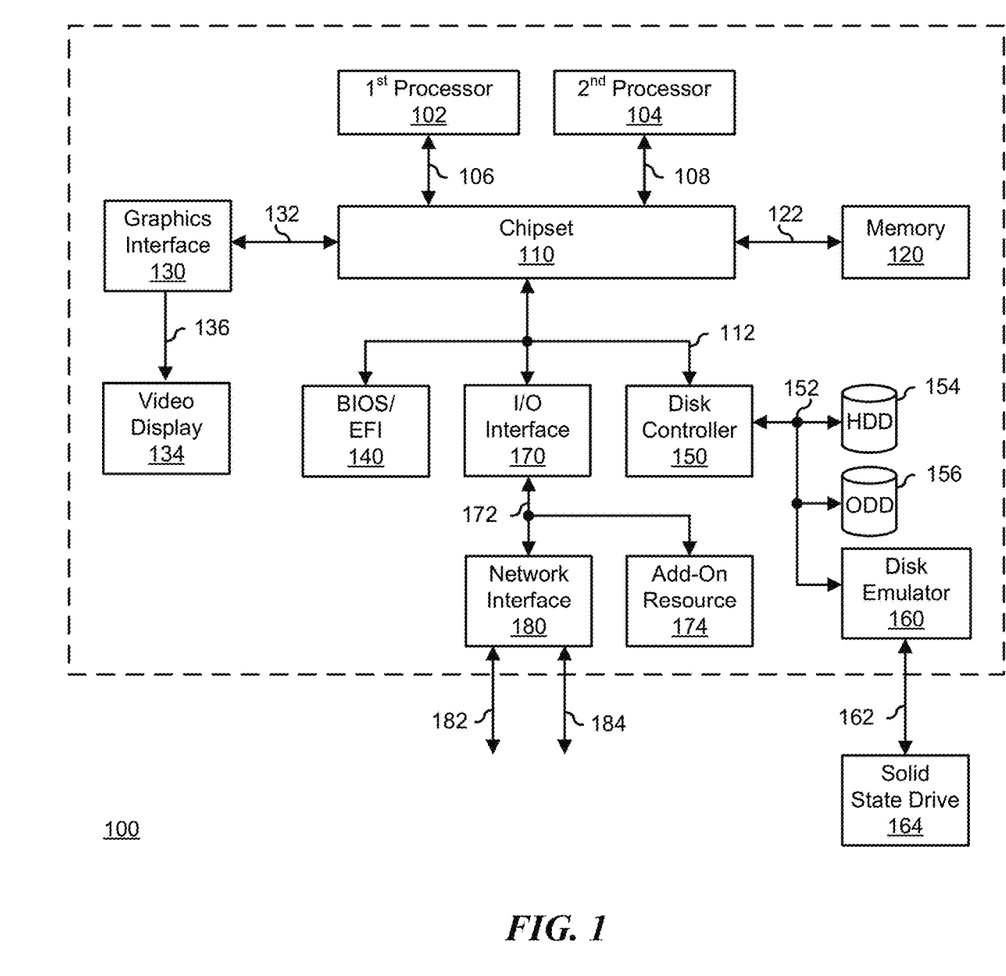
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a peripheral card disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniB and channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
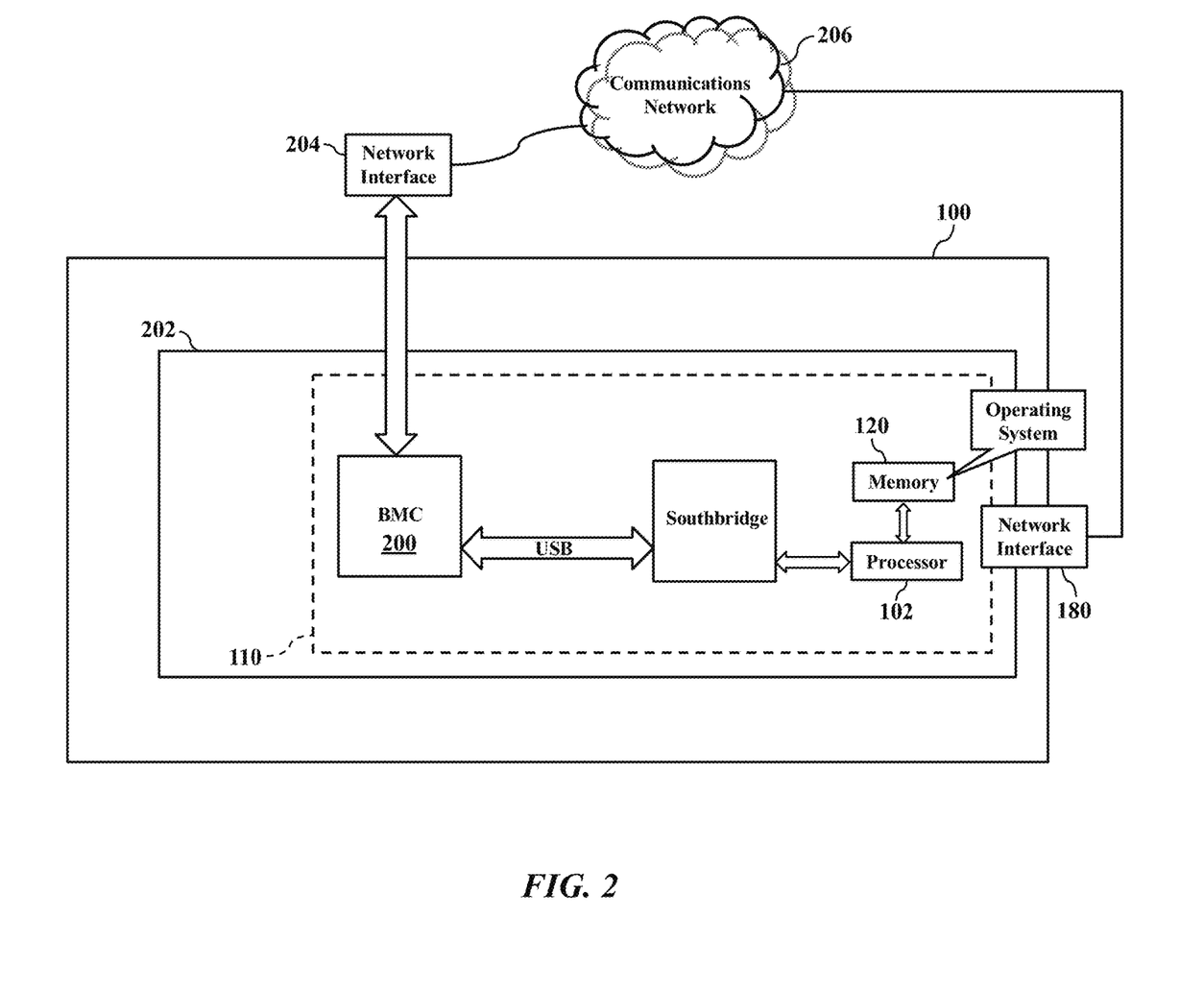
FIGS. 2-3 further illustrate the information handling system, according to exemplary embodiments.

FIG. 2 shows the information handling system 100 including a baseboard management controller 200. The baseboard management controller 200 has its own management processor and memory device (not shown for simplicity) that interfaces with a motherboard or planar 202 to provide side-band and out-of-band remote management (such as according to the Intelligent Platform Management Interface specification). The baseboard management controller 200 has one or more physical communications links and interfaces to the motherboard 202, thus allowing the baseboard management controller 200 to process messages according to the IPMI specification. The baseboard management controller 200 may thus monitor and remotely report the functions and performance of the information handling system 100 via a separate network interface 204 to a communications network 206. The baseboard management controller 200 and the IPMI specification are generally well known and thus need not be explained in detail.

Figure 3:
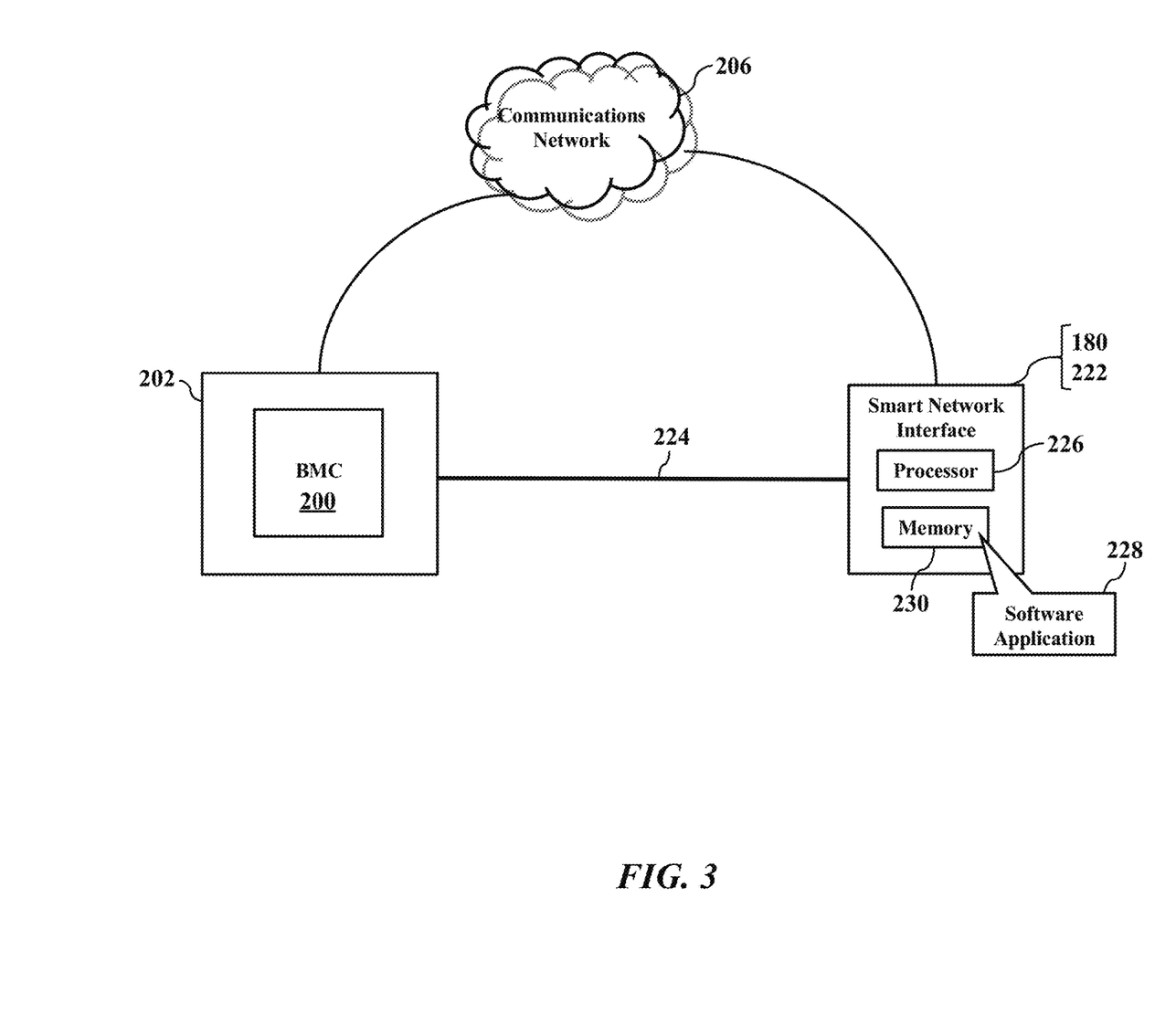

FIG. 3 shows the network interface 180 illustrated as a peripheral card 222 that connects to the baseboard management controller 200 via a bus 224. The network interface 180 may be a smart network interface having its own dedicated local processor 226 that executes a software application 228 locally stored in a solid-state memory device 230. The processor 226 may be a multi-core microprocessor, application specific integrated circuit, or field programmable gate array. While the bus 224 may use any architecture and/or protocol, such as an $I^2C$ (or I2C) serial bus protocol or the derivative system management bus (SMBus or SMB), FIG. 3 illustrates a sideband network connection over an RMII bus as defined by the NC-SI standard that allows network traffic to be sent and received by the BMC over the network interface card. Electrical signals and/or electrical power may then be communicated or conveyed via the bus 224 between the network interface 180 and the baseboard management controller 200. The smart network interface 180 may thus cooperate with the baseboard management controller 200 to implement remote functional management.

Internet protocol address management for system management devices has been a challenge. For example, with the baseboard management controller 200 networking configured to utilize DHCP, the information handling system 100 may acquire an address, but discovering what that address is may not be obvious. Associating the baseboard management controller 200 network address with a particular machine service tag, or perhaps with the host operating system Internet protocol (IP) address, is not an automatic process. Second, if addresses are allocated and configured as static addresses, administrators still somehow need to make this association, which would be even more difficult with multiple endpoints in the information handling system 100.

The smart network interface 180 may also need remote management. The smart network interface 180 is yet another programmable device (perhaps several) on a server or other information handling system 100 that potentially needs remote management. Because each smart network interface 180 may have its own IP address, these individual and/or separate IP addresses may compound efforts to correlate multiple disassociated IP addresses to one information handling system 100. For example, a problem may occur at host address x, and the administrator needs to figure out what addresses y and z to access for troubleshooting. The host processor, smart NIC processor, and the BMC processor may all be accessed by different IP addresses, making it difficult for a system administrator to associate these addresses as belonging to the same machine.

Figure 4:
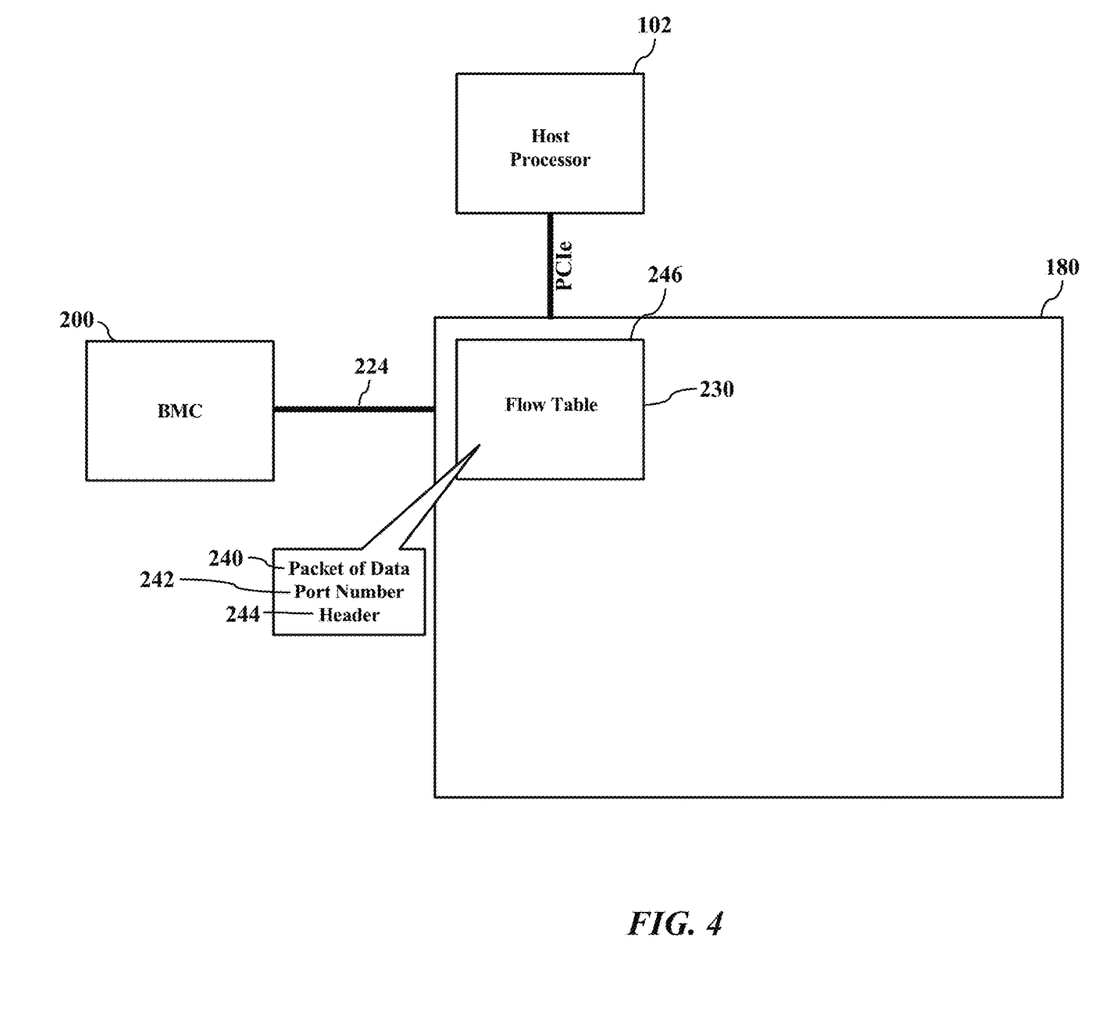
FIG. 4 illustrates consolidation of IP address management, according to exemplary embodiments.

FIG. 4 illustrates consolidation of IP address management, according to exemplary embodiments. The smart network interface 180 may have routing features that inspect headers and/or bodies/payloads and execute logical rules or hardware/silicon architectures to identify and route packets 240 of data for management purposes. For example, perhaps using the OpenFlow communications standard, the packets 240 of data for remote management purposes may be matched from the port number 242 in the TCP/IP packet header 244. The smart network interface 180 may implement a flow table 246 (perhaps in the memory device 230 as a hardware or software filter). For the purpose of this illustration, the Flow Table 246 is comprised of the configurable table and its associated router. The smart network interface 180 may inspect the TCP/IP packet header 244 of any or all received packets 240 of data for the data, information, or field representing the port number 242. The baseboard management controller 200 may thus establish and reserve a particular port number 242 for remote management functions. The baseboard management controller 200 may then send a command or message via the bus 224 to notify or inform the smart network interface 180 to identify and/or to segregate those packets 240 of data having the port number 242 reserved for remote management functions. So, instead of conventionally using the layer 2 MAC address in the NC-SI standard, the smart network interface 180 may be instructed to identify the TCP/IP packet headers 244 specifying the port number 242 for remote management functions.

Figure 5:
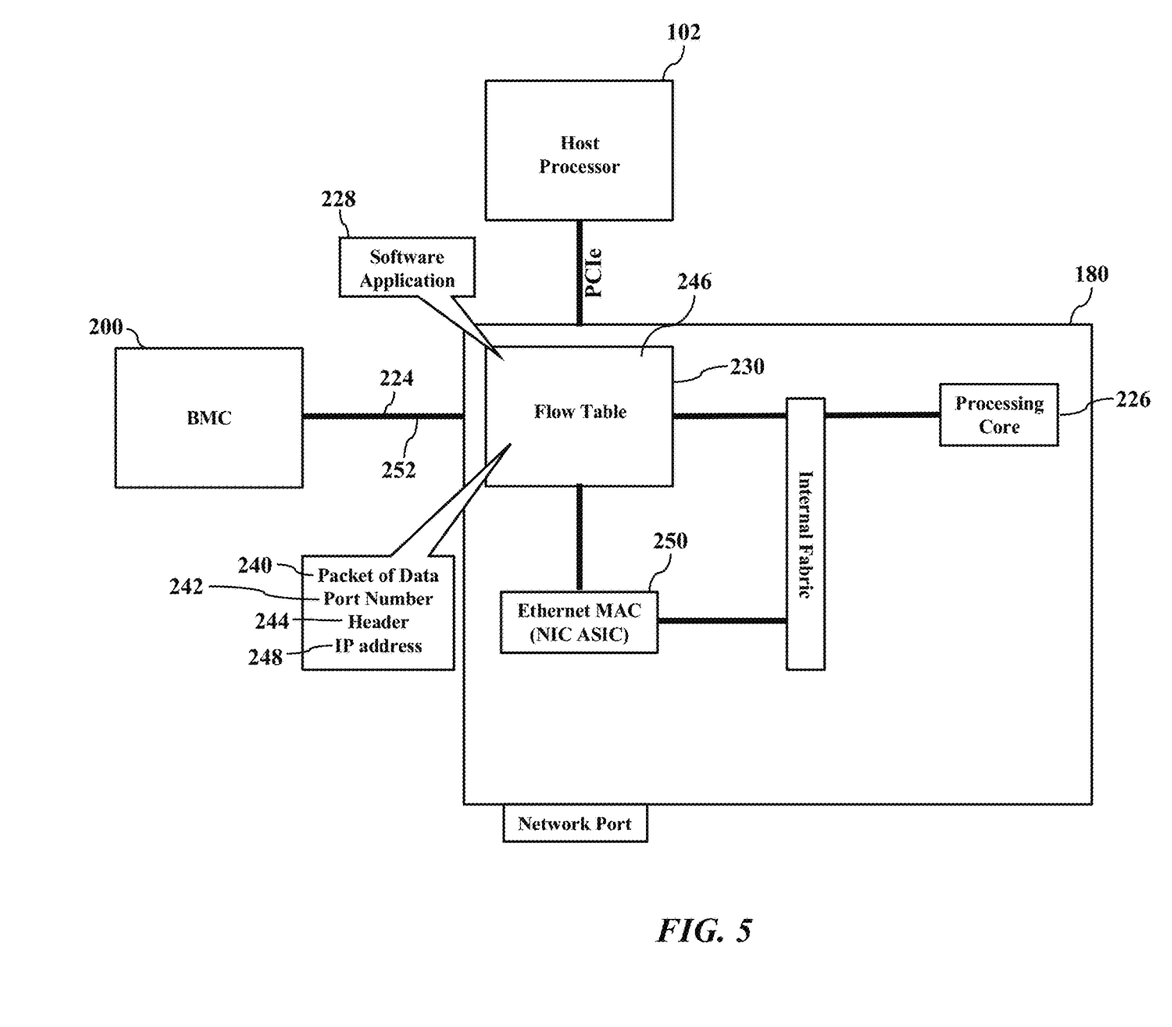
FIG. 5 illustrates architectural details for sharing an IP address according to exemplary embodiments.

FIG. 5 illustrates more architectural details for sharing an IP address 248, according to exemplary embodiments. Any and all peripheral devices in the information handling system 100 can share the IP address 248, perhaps based on the port number 242. The smart network interface 180 may interface with the baseboard management controller 200 via the bus 224 (as earlier explained). The smart network interface 180 has the processor 226 that executes the software application 228 locally stored in the solid-state memory device 230. The smart network interface 180 may also have its own dedicated Ethernet controller 250 that also interfaces with the processor 226 and the solid-state memory device 230 (perhaps via another bus technology and architecture). The flow table 246 may also interface with the processor 226, the solid-state memory device 230, and the Ethernet controller 250. The baseboard management controller 200 may thus send a command or message 252 via the bus 224 that specifies the port number 242 for remote management functions. When the smart network interface 180 receives the command or message 252, the software application 228 causes the processor 226 to inspect the command or message 252 and read or identify the port number 242 specified by the command or message 252. The software application 228 then instructs the processor 226 to program and/or configure the flow table 246 with the logical rules specifying the port number 242 for routing management packets 240 of data. After the flow table is configured, the routing functionality of the smart network interface 180 may route packets to the desired destination (BMC, host processor, or smart NIC processor) based on the configured rules, utilizing any parameter in the packet, not limited to the MAC address.

Figure 6:
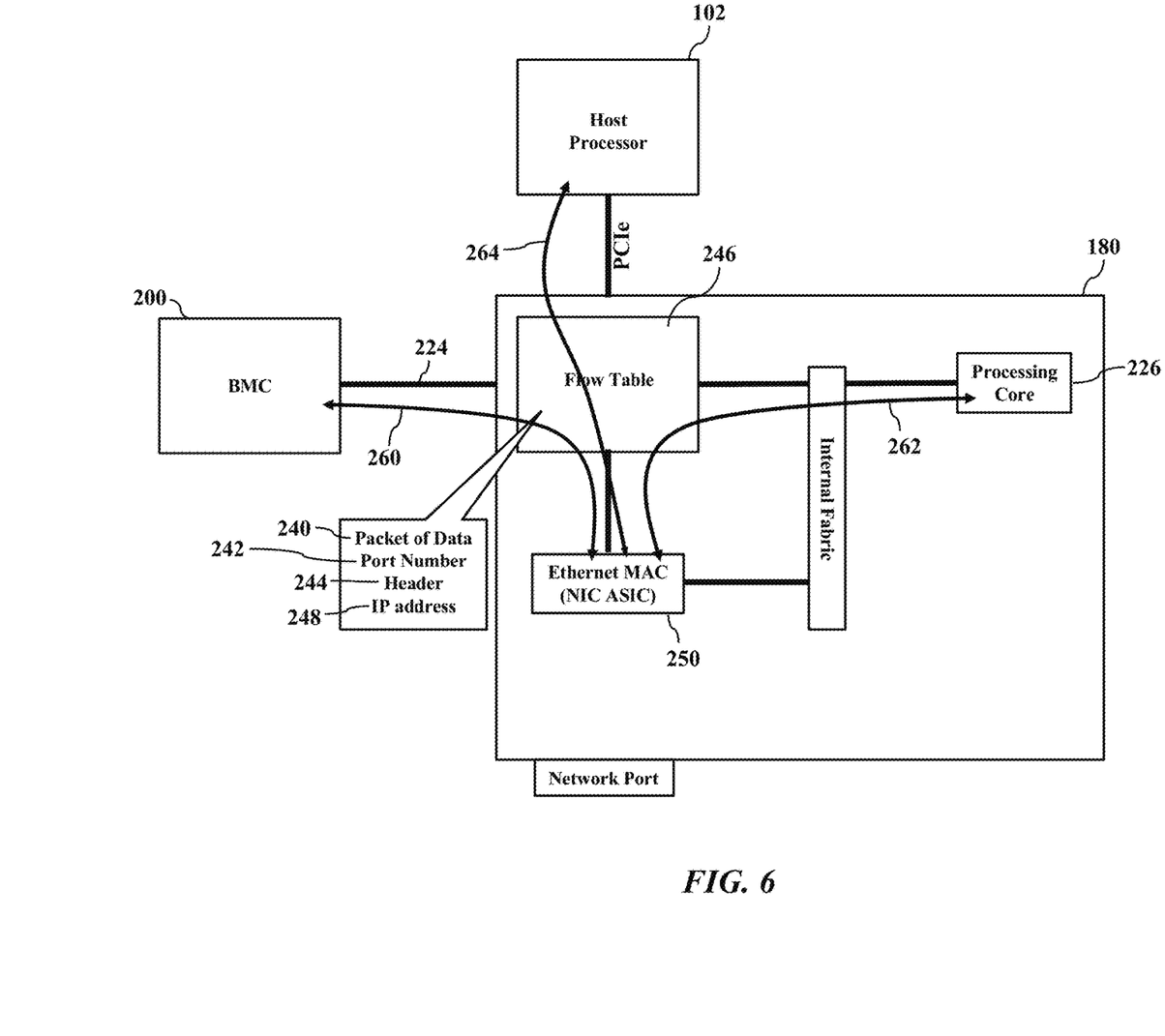
FIGS. 6-7 further illustrate system management sharing of the IP address, according to exemplary embodiments.
Figure 7:
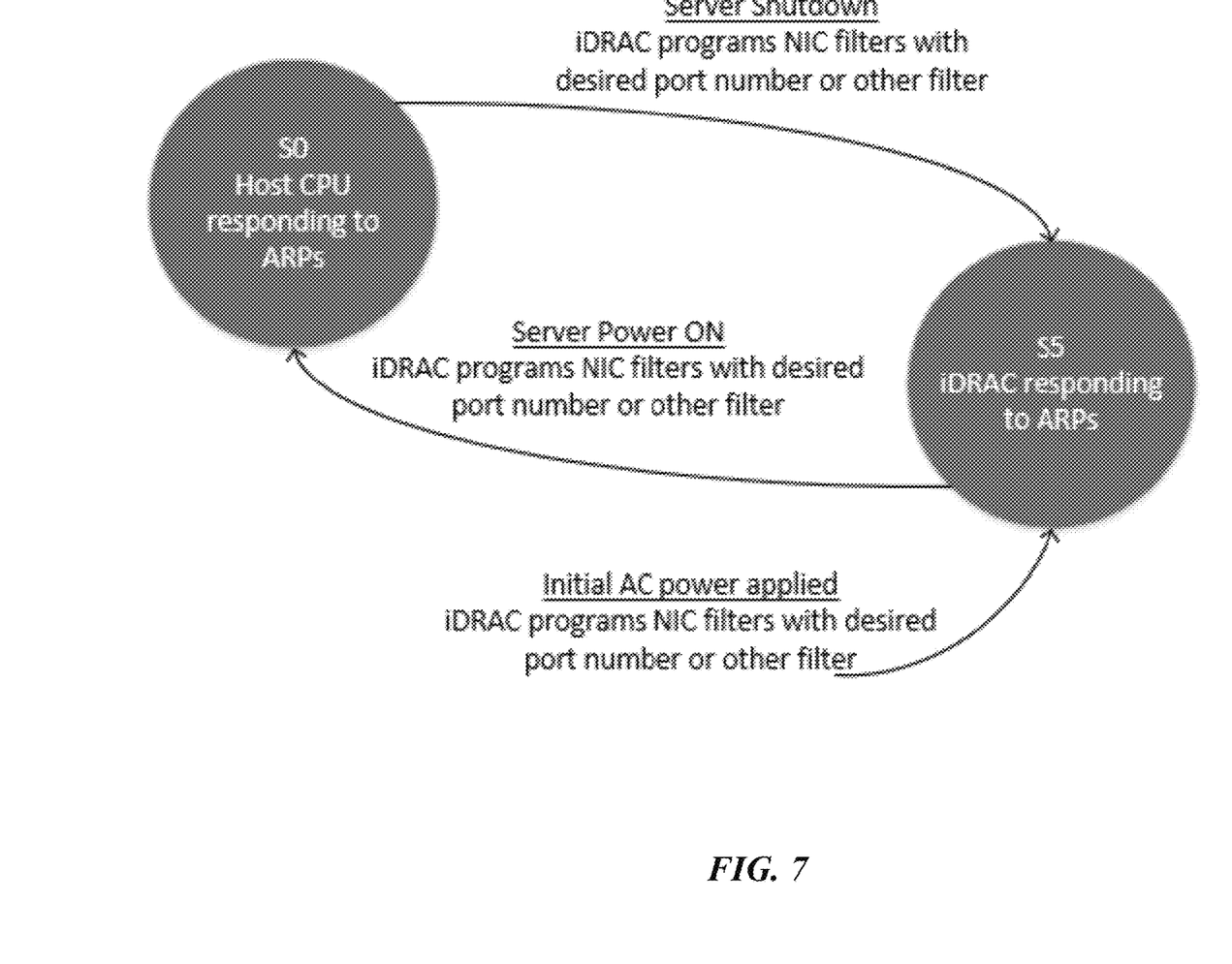

FIGS. 6-7 further illustrate system management sharing of the IP address 246, according to exemplary embodiments. FIG. 6 illustrates packet flows, while FIG. 7 is a state diagram illustrating ARP response. The baseboard management controller 200 instructs the smart network interface 180 to program or configure the flow table 246 for the port number 242 reserved for remote management functions. The smart network interface 180 may then inspect all IP traffic for those packets 240 of data having the port number 242 specified by the TCP/IP packet headers 244. The smart network interface 180 may thus use the flow table 246 as a packet filter to route the packets 240 of data to their appropriate destination, with remote management functions identified by the port number 242 specified by the TCP/IP packet headers 244. Some packets 240 of data, for example, may flow or route to/from the baseboard management controller 200 and the Ethernet controller 250 (illustrated as reference numeral 260). Other packets 240 of data may flow or route to/from the Ethernet controller 250 to the processor 226 (illustrated as reference numeral 262). Still other packets 240 of data may flow or route to/from the Ethernet controller 250 to the host processor 102 (illustrated as reference numeral 264).

Security issues may arise. Once concern is that an outside rogue user could gain access to the baseboard management controller 200, which is not necessarily the case today when the baseboard management controller 200 is operating in shared NIC mode. The IP address associated with the baseboard management controller 200 may be firewalled or otherwise restricted to a subnet so that outside access is not possible. The port number 242 may be similarly firewalled to prevent rogue access. In both cases, the same precautions may be taken by users installing servers in a DMZ. Additionally, the port number 242 may be defaulted off such that it needs to be consciously enabled to work. As an additional measure, the smart network interface 180 may enforce access control lists, in which only certain source addresses, and/or specific remote devices, can send packets and communicate with the baseboard management controller 200. A compromised BMC, for example, may be prevented from sending illegal traffic. Moreover, the baseboard management controller 200 may share the same management address with the smart network interface 180 independent of the host.

FIG. 7 illustrate logical state issues. If the host information handling system 100 is electrically powered off, the baseboard management controller 200 will need to respond to ARP (address revolution protocol) requests, so the programming or configuration of the flow table 246 may change if the host server 100 is powered on. For security, perhaps only ARP requests may be allowed to pass through when the server 100 is in S5 state. The flow table 246 may thus be reprogrammed in the S5 state to pass ARP requests to the sideband. When AC power is initially applied, the baseboard management controller 200 may instruct the smart network interface 180 to program the flow table 246 with the port number 242 reserved for remote management functions. When the host information handling system 100 is electrically powered on in the S0 state, the baseboard management controller 200 may instruct the smart network interface 180 to program the flow table 246 with the port number 242 reserved for remote management functions, thus allowing the host processor 102 to respond to ARP requests. When the host information handling system 100 shuts down in the S5 state, the baseboard management controller 200 may instruct the smart network interface 180 to program the flow table 246 with the port number 242 reserved for remote management functions, thus allowing the baseboard management controller 200 to respond to ARP requests. The smart network interface 180 and/or the flow table 246 may thus be always electrically powered, active, and available even in the S5 state.

The smart network interface 180 and/or the flow table 246 may thus use regular flow rules to define a way for multiple devices on the host information handling system 100 to share the IP address 248. The IP address 248 may be shared based on the port number 242. Packet traffic may thus be managed internal to the ASIC fabric of the smart network interface 180 as well as external to other devices (such as the baseboard management controller 200) over physical media (such as i2c, PCIe VDM, RMII). The baseboard management controller 200 may respond to ARP requests and change the filtering of the flow table 246 on a transition from the S0 state to the S5 state.

The flow table 246 is thus a dynamic address management mechanism. The baseboard management controller 200 instructs the smart network interface 180 to program the flow table 246 with the port number 242 reserved for remote management functions. The port number 242, in other words, may be dynamically changed by the baseboard management controller 200 and/or by a remote administrator. New and old management packets 240 of data may be distinguished by active/inactive or valid/invalid port numbers 242 according to date/time or other calendar. Logs of the port numbers 242 may thus maintained and inspected to reveal historical changes in the active or correct port number 242. Indeed, subnet port numbers 242 may be established to distinguish management packets reserved for the baseboard management controller 200, the processor 226, and the host processor 102 (as illustrated in FIG. 7). Because the IP address 248 may thus have the dynamic port number 242, the flow table 246 differs from a conventional network address translation scheme, which requires a static private network and which may conflict with customer's existing network.

The host's IP address may be determined. The baseboard management controller 200 may need to learn the host's IP address. For example, the host's IP address may be acquired 1) via the Network Controller Sideband Interface, 2) via an agent or special device driver installed in the host operating system and/or via 3) sniffing the packets 240 of data (if allowed by the network device). Both the baseboard management controller 200 and the smart network interface 180 may receive network traffic on their default or configured address in addition to the host IP address (if this feature is enabled).

Exemplary embodiments present an elegant solution. Previous schemes have proposed that the baseboard management controller 200 respond to server packets while asleep, but these previous schemes were not fully enabled or implemented. Exemplary embodiments, instead, use dynamically configurable logical flow rules to resolve a long felt need in remote management. Many previous schemes have been developed over time in an effort to partially counter the difficulty in managing and discovering management IP addresses, including the front panel LCD, DHCP for iDRAC, zero touch provisioning, default address allocation, address specification in the local setup screen through the BIOS F2 menus, iDRAC Direct, and shared NIC mode for BMC networking.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network interface card, comprising:
a hardware processor; and
a memory device accessible to the hardware processor, the memory device storing instructions that when executed cause the hardware processor of the network interface card to perform operations, the operations including:
receiving a message sent from a baseboard management controller to the network interface card, the message specifying a remote management port number reserved by the baseboard management controller for a remote management of an information handling system;
determining a system power state describing a consumption of an electrical power by the information handling system;
programming a flow table according to the system power state;

receiving packets of data at the network interface card via a communications network;

compaing by the network interface card headers of the packets of data to the flow table programmed according to the system power state;

identifying the packets of data having the headers specifying the remote management port number configured by the flow table programmed according to the system power state; and routing the packets of data having the headers specifying the remote management port number to a destination configured by the flow table programmed according to the system power state.

2. The network interface card of claim 1, wherein the operations further comprise configuring the flow table.

3. The network interface card of claim 1, wherein the operations further comprise routing the packets of data having the headers specifying the port number to a host processor operating in the information handling system.

4. The network interface card of claim 1, wherein the operations further comprise routing the packets of data having the headers specifying the port number to a local processor operating in the network interface card.

5. The network interface card of claim 1, wherein the operations further comprise routing the packets of data having the headers specifying the port number to the baseboard management controller.

6. The network interface card of claim 1, wherein the operations further comprise determining an Internet address specified by the packets of data received via the communications network.

7. The network interface card of claim 1, wherein the operations further comprise determining an Internet address specified by the packets of data received via the communications network.

8. The network interface card of claim 1, wherein the operations further comprise dynamically configuring logical flow rules stored by the network interface card with the port number.

9. A method for remote management of an information handling system, comprising:

receiving, by a network interface card, a message sent from a baseboard management controller operating in the information handling system, the message identifying a port number reserved by the baseboard management controller for the remote management of the information handling system;

determining a system power state describing a consumption of an electrical power by the information handling system;

programming a flow table according to the system power state;

receiving, by the network interface card, packets of data via a communications network;

determining the packets of data having headers specifying the port number that match the flow table programmed according to the system power state; and routing, by the network interface card, the packets of data having the headers specifying the port number to a destination configured by the flow table programmed according to the system power state.

10. The method of claim 9, further comprising configuring the flow table.

11. The method of claim 9, further comprising routing the packets of data having the headers specifying the port number to a host processor operating in the information handling system.

12. The method of claim 9, further comprising routing the packets of data having the headers specifying the port number to a local processor operating in the network interface card.

13. The method of claim 9, further comprising routing the packets of data having the headers specifying the port number to the baseboard management controller operating in the information handling system.

14. The method of claim 9, further comprising determining an Internet address specified by the packets of data received via the communications network.

15. The method of claim 9, further comprising dynamically configuring logical flow rules with the port number for the determining of the packets of data reserved for the remote management of the information handling system.

16. A memory device storing instructions that when executed cause a hardware processor of a network interface card to perform operations, the operations comprising:

reserving a port number for a remote management by sending a message from a baseboard management controller via a bus to the network interface card, the message specifying the port number for identifying packets of data reserved for the remote management of an information handling system;

determining a system power state describing a consumption of an electrical power by the information handling system;

programming a flow table according to the system power state;

receiving the packets of data via the network interface card to a communications network;

comparing headers of the packets of data to the flow table programmed according to the system power state;

identifying the packets of data having the headers specifying the port number that match the flow table programmed according to the system power state; and routing the packets of data having the headers specifying the port number to a destination configured by the flow table programmed according to the system power state.

17. The memory device of claim 16, wherein the operations further comprise configuring the flow table.

18. The memory device of claim 16, wherein the operations further comprise dynamically configuring logical flow rules stored by the network interface card with the port number for the identifying of the packets of data reserved for the remote management of the information handling system.

19. The memory device of claim 16, wherein the operations further comprise routing the packets of data having the headers specifying the port number to the baseboard management controller.

20. The memory device of claim 16, wherein the operations further comprise routing the packets of data having the headers specifying the port number to a local processor operating in the network interface card.

* * * * *